(12) United States Patent
Nakajima et al.

(10) Patent No.: US 9,670,917 B2
(45) Date of Patent: Jun. 6, 2017

(54) AIRCRAFT MOTOR DRIVE CONTROL APPARATUS AND AIRCRAFT ACTUATOR HYDRAULIC SYSTEM

(71) Applicant: NABTESCO CORPORATION, Tokyo (JP)

(72) Inventors: Kazushige Nakajima, Gifu (JP); Tokuji Tsunematsu, Gifu (JP); Shingo Nakagawa, Gifu (JP)

(73) Assignee: NABTESCO CORPORATION, Tokyo (JP)

( * ) Notice: Subject to any disclaimer, the term of this patent is extended or adjusted under 35 U.S.C. 154(b) by 325 days.

(21) Appl. No.: 13/908,790

(22) Filed: Jun. 3, 2013

(65) Prior Publication Data

US 2013/0330207 A1 Dec. 12, 2013

(30) Foreign Application Priority Data

Jun. 8, 2012 (JP) ................... 2012-130442

(51) Int. Cl.
*H02P 27/00* (2006.01)
*F04B 17/03* (2006.01)
*H02P 23/00* (2016.01)
*H02P 6/24* (2006.01)
(Continued)

(52) U.S. Cl.
CPC ............ *F04B 17/03* (2013.01); *F04B 49/002* (2013.01); *H02P 6/24* (2013.01); *H02P 23/0004* (2013.01); *H02P 23/20* (2016.02)

(58) Field of Classification Search
USPC ......................... 318/723, 671, 156, 552, 554
See application file for complete search history.

(56) References Cited

U.S. PATENT DOCUMENTS

| 5,614,803 A * | 3/1997 | Morioka ........... H02M 7/53875 |
| | | 318/590 |
| 2009/0195197 A1* | 8/2009 | Nishimura .......... B60L 11/1803 |
| | | 318/400.09 |

FOREIGN PATENT DOCUMENTS

| JP | 2004048885 A | * | 2/2004 |
| JP | 2005-117869 A | | 4/2005 |
| JP | 2007-151344 A | | 6/2007 |

(Continued)

OTHER PUBLICATIONS

An Office Action; "Notification of Reason for Rejection," issued by the Japanese Patent Office on Feb. 26, 2016, which corresponds to Japanese Patent Application No. 2012-130442 and is related to U.S. Appl. No. 13/908,790; with English language translation.

*Primary Examiner* — Bentsu Ro
*Assistant Examiner* — Iftekhar Mustafa
(74) *Attorney, Agent, or Firm* — Studebaker & Brackett PC

(57) ABSTRACT

A controller that performs pulse width modulation control of a three-phase inverter circuit includes a three-phase modulation voltage command value generation unit, a two-phase modulation voltage command value generation unit, a voltage command switching unit, and a PWM signal output unit. The voltage command switching unit switches a voltage command value to a two-phase modulation voltage command value when a determination value becomes larger than or equal to a first threshold value, and switches the voltage command value to a three-phase modulation voltage command value when the determination value becomes smaller than a second threshold value, which is smaller than the first threshold value.

5 Claims, 8 Drawing Sheets

(51) Int. Cl.
  *F04B 49/00*    (2006.01)
  *H02P 23/20*    (2016.01)

(56) References Cited

FOREIGN PATENT DOCUMENTS

| JP | 2011-211799 A |   | 10/2011 |
|----|---------------|---|---------|
| JP | 2011-247334 A |   | 12/2011 |
| JP | 2011247334 A  | * | 12/2011 |

* cited by examiner

AIRCRAFT MOTOR DRIVE CONTROL APPARATUS AND AIRCRAFT ACTUATOR HYDRAULIC SYSTEM

CROSS-REFERENCE TO RELATED APPLICATION

This application claims priority to Japanese Patent Application No. 2012-130442. The entire disclosure of Japanese Patent Application No. 2012-130442 is hereby incorporated herein by reference.

BACKGROUND OF THE INVENTION

Field of the Invention

The present invention relates to an aircraft motor drive control apparatus that drives a three-phase motor mounted in an aircraft to drive a device installed in the aircraft and controls an operational status of this three-phase motor, and an aircraft actuator hydraulic system including an aircraft motor drive control apparatus.

Description of Related Art

Various electrically powered devices are installed in an aircraft, and such devices are driven by electric motors mounted in the aircraft. Examples of the aforementioned devices include an electrically powered hydraulic pump for supplying pressure oil to a hydraulically operated actuator that drives moving surfaces, as disclosed in JP2011-247334A. Note that the moving surfaces include primary flight control surfaces configured as control surfaces such as ailerons, rudders, elevators, and the like, and secondary flight control surfaces configured as flaps, spoilers, and the like. Also, other examples of the devices include an electric actuator for driving the aforementioned moving surfaces, or the struts (mechanism supporting the airframe of the aircraft on the ground) of a landing gear (undercarriage) or the like.

A three-phase motor is often used as an electric motor for driving the aforementioned devices. A motor drive control apparatus (aircraft motor drive control apparatus) that is also mounted in the aircraft drives the three-phase motor, and controls the operational status of the three-phase motor. Also, from the viewpoint of efficiency improvement, it is possible to use, as such a motor drive control apparatus, a motor drive control apparatus including a three-phase inverter circuit that has switching elements and drives a three-phase motor, and a controller that performs pulse width modulation control (PWM control) of this three-phase inverter circuit.

Also, JP2005-117869A discloses, as a motor drive control apparatus to be provided in a vehicle, a motor drive control apparatus that alternately fixes an on/off state of a switching element of one phase in a three-phase inverter circuit, and modulates on/off states of switching elements of the other two phases. In other words, JP 2005-117869A discloses a motor drive control apparatus that employs a so-called two-arm control method.

SUMMARY OF THE INVENTION

In an aircraft, regarding the mounted devices, there are many restrictions on the installation space and requirements of weight reduction. For this reason, it is desirable to reduce the size and weight of the devices installed in an aircraft. Further, regarding a three-phase motor mounted in an aircraft as well, it is desirable to reduce the size and weight without degrading output specifications, or in a state where the three-phase motor is set to conform to higher-level output specifications. Accordingly, in the specifications of a three-phase motor for driving devices installed in an aircraft, the rotational speed tends to be set comparatively high and the torque tends to be set comparatively low, in order to maintain the output while achieving a reduction in the size.

In the aforementioned case, in a motor drive control apparatus that includes a three-phase inverter circuit and a controller for performing PWM control and controls an operational status of the three-phase motor, it is necessary, in order to ensure control stability, that a PWM frequency, which is a switching frequency (carrier frequency) for a switching element, is a high frequency. However, an increase in the PWM frequency leads to an increase in switching element loss that is proportional to the PWM frequency, resulting in an increase in the amount of heat generation.

As a measure against the aforementioned increase in the amount of heat generation, it is generally conceivable to install a cooling device that forcibly cools the motor drive control apparatus, or cools the motor drive control apparatus by promoting heat release using a heat sink. However, this measure will result in an increase in the weight and size of the devices installed in the aircraft. Accordingly, it is desired that a motor drive control apparatus is realized in which heat generation of the motor drive control apparatus is suppressed, and that can both ensure control stability and suppress heat generation in a well-balanced manner.

With regard to the above, it is conceivable to reduce the number of switching elements that perform a switching operation and suppress heat generation by means of a reduction in switching element loss by performing drive control of a three-phase motor using the two-arm control method. However, in the case where drive control of the three-phase motor using the two-arm control method is performed, it is likely to be difficult to maintain a stable rotation state in an operating region where the operating point of the three-phase motor is at a low rotational speed or at low torque. In other words, in this operating region, in the case where an on/off state of one phase of the three-phase inverter circuit is alternately fixed and on/off states of the other two phases are modulated, a situation may occur in which the fixed switching phase is not switched in appropriate order, causing a sudden change in the phase current or the like, and it becomes difficult to maintain a stable rotational state.

Regarding the aforementioned problem, JP2005-117869A discloses a motor drive control apparatus that uses a complicated control algorithm and control parameter for appropriately switching the fixed switching phase. More specifically, a two-phase modulation voltage command value generating means in the motor drive control apparatus disclosed in JP2005-117869A is provided with a configuration using a complicated control algorithm and control parameter that are constituted by a fixed mode storing means, a fixed mode change order storing means, a fixed mode calculation means, a change order determining means, and a two-phase modulation voltage command value calculation means.

On the other hand, particularly in a motor drive control apparatus (aircraft motor drive control apparatus) used in drive control of a motor for driving devices installed in an aircraft for such use as that in JP2011-247334A, the operational status of a three-phase motor is rarely controlled in an operating region of a low rotational speed or of low torque, while it is desired that both the ensuring of control stability and the suppressing of heat generation can be achieved at a high level in a well-balanced manner. Furthermore, a motor drive control apparatus is desirable that is capable of both ensuring control performance and suppressing heat generation with a simple structure that does not need such a complicated control algorithm and control parameter for appropriately switching the fixed switching phase as those disclosed in JP2005-117869A.

In light of the foregoing situation, an object of the present invention is to provide an aircraft motor drive control apparatus that is capable of suppressing heat generation of the motor drive control apparatus itself, and is capable of both ensuring control performance and suppressing heat generation at a high level in a well-balanced manner with a simple configuration that does not need a complicated control algorithm and control parameter for appropriately switching a fixed switching phase. Also, an object of the present invention is to provide an aircraft actuator hydraulic system including this aircraft motor drive control apparatus.

An aircraft motor drive control apparatus according to an aspect of the present invention for achieving the above-stated object relates to an aircraft motor drive control apparatus for driving a three-phase motor mounted in an aircraft to drive a device installed in the aircraft, and controlling an operational status of the three-phase motor. The aircraft motor drive control apparatus according to an aspect of the present invention comprises: a three-phase inverter circuit that has switching elements and drives the three-phase motor; and a controller that performs pulse width modulation control of the three-phase inverter circuit, the controller comprising: a three-phase modulation voltage command value generation unit that generates a three-phase modulation voltage command value as a voltage command value for specifying a voltage to be applied to the three-phase motor; a two-phase modulation voltage command value generation unit that generates, as the voltage command value, a two-phase modulation voltage command value for alternately fixing an on/off state of a switching element of one phase in the three-phase inverter circuit, and modulating on/off states of switching elements of the other two phases; a voltage command switching unit for configuring a setting so as to switch the voltage command value from one of the three-phase modulation voltage command value and the two-phase modulation voltage command value to the other, based on a determination value that is used in determination, which is one of a value of a rotational speed of the three-phase motor and a value of a torque current component of the three-phase motor; and a PWM signal output unit that generates a PWM signal for performing pulse width modulation control of the three-phase inverter circuit based on the voltage command value generated as the three-phase modulation voltage command value or the two-phase modulation voltage command value, and outputs the PWM signal to the three-phase inverter circuit, wherein the voltage command switching unit sets the voltage command value to the three-phase modulation voltage command value until the determination value first reaches a predetermined first threshold value after the three-phase motor starts to rotate, switches the voltage command value to the two-phase modulation voltage command value when the determination value becomes larger than or equal to the first threshold value, and switches the voltage command value to the three-phase modulation voltage command value when the determination value becomes smaller than a predetermined second threshold value, which is smaller than the first threshold value.

With this configuration, a setting is configured such that the voltage command value is switched from one of the three-phase modulation voltage command value and the two-phase modulation voltage command value to the other by the operation of the voltage command switching unit, based on the determination value related to either the rotational speed of the three-phase motor or the torque current component thereof. The voltage command switching unit sets the voltage command value to the three-phase modulation voltage command value until the determination value first reaches the first threshold value after the start of operation, switches the voltage command value to the two-phase modulation voltage command value when the determination value becomes larger than or equal to the first threshold value, and switches the voltage command value to the three-phase modulation voltage command value when the determination value becomes smaller than the second threshold value, which is smaller than the first threshold value. For this reason, in an operating region of a low rotational speed or of low torque, which is a short temporal region after the start of operation, drive control of the three-phase motor using a so-called three-arm control method is performed by the motor drive control apparatus. However, upon the determination value reaching the first threshold value, a setting is configured such that the voltage command value is switched to the two-phase modulation voltage command value. Thereafter, unless the determination value becomes smaller than the second threshold value, drive control of the three-phase motor using the two-arm control method is continued by the motor drive control apparatus. For this reason, the number of switching elements that perform a switching operation is reduced, and thus heat generation is suppressed by means of a reduction of switching element loss. In particular, in a motor drive control apparatus used in an aircraft in drive control of a three-phase motor for driving a device installed for such use as that disclosed in JP2011-247334A, the operational status of the three-phase motor is rarely controlled in an operating region of a low rotational speed or at low torque. Accordingly, in most operational states once the operation of the three-phase motor has started, drive control of the three-phase motor using the two-arm control method is performed. In this case, in most operational states, the number of switching elements that perform a switching operation is reduced, and thus, heat generation is suppressed by means of a reduction of switching element loss. Thus, with the above configuration, it is possible to suppress heat generation of the motor drive control apparatus itself, and to both ensure control performance and suppress heat generation at a high level in a well-balanced manner. Also, both the ensuring of control performance and the suppressing of heat generation is achieved at a high level in a well-balanced manner with a simple configuration in which a setting is configured such that the voltage command value is switched from one of the three-phase modulation voltage command value and the two-phase modulation voltage command value to the other, based on the determination value related to either the rotational speed of the three-phase motor or the torque current component thereof. In other words, such a complicated control algorithm and control parameter as those disclosed in JP2005-117869A are not necessary.

Accordingly, with the above configuration, it is possible to provide an aircraft motor drive control apparatus that is capable of suppressing heat generation of the motor drive control apparatus itself, and is capable of both ensuring control performance and suppressing heat generation at a high level in a well-balanced manner with a simple configuration that does not need a complicated control algorithm and control parameter for appropriately switching the fixed switching phase.

Also, in the above-described aircraft motor drive control apparatus, it is desirable that the voltage command switching unit switches the voltage command value from the three-phase modulation voltage command value to the two-phase modulation voltage command value at the time when a voltage difference between voltage command values for two of three phases in the three-phase modulation voltage command value becomes zero.

With this configuration, the voltage command value is switched from the three-phase modulation voltage command value to the two-phase modulation voltage command value at the time when the voltage difference between the voltage command values for two of the three phases in the three-phase modulation voltage command value is zero. For this reason, it is possible to make it less likely that waveform distortion occurs when the voltage command value is switched from the three-phase modulation voltage command value to the two-phase modulation voltage command value, and occurrence of instantaneous overcurrent and of electromagnetic interference (EMI) can be suppressed.

Also, an aircraft actuator hydraulic system according to an aspect of the present invention for achieving the above-stated object relates to an aircraft actuator hydraulic system that has a hydraulically operated actuator for driving a movable mechanism installed in an aircraft and supplies pressure oil to the actuator. The aircraft actuator hydraulic system according to an aspect of the present invention comprises: the actuator operating as a result of pressure oil being supplied from an aircraft central hydraulic power source, which is a hydraulic power source installed on an airframe side of the aircraft, and driving the movable mechanism; a backup hydraulic pump capable of supplying pressure oil to the actuator when a loss or degradation of a function of the aircraft central hydraulic power source occurs; a three-phase motor that drives the backup hydraulic pump; and an aircraft motor drive control apparatus that drives the three-phase motor mounted in the aircraft to drive the backup hydraulic pump and controls an operational status of the three-phase motor, wherein the aircraft motor drive control apparatus includes a three-phase inverter circuit that has switching elements and drives the three-phase motor, and a controller that performs pulse width modulation control of the three-phase inverter circuit, the controller comprising: a three-phase modulation voltage command value generation unit that generates a three-phase modulation voltage command value as a voltage command value for specifying a voltage to be applied to the three-phase motor; a two-phase modulation voltage command value generation unit that generates, as the voltage command value, a two-phase modulation voltage command value for alternately fixing an on/off state of a switching element of one phase in the three-phase inverter circuit, and modulating on/off states of switching elements of the other two phases; a voltage command switching unit for configuring a setting so as to switch the voltage command value from one of the three-phase modulation voltage command value and the two-phase modulation voltage command value to the other, based on a determination value that is used in determination, which is one of a value of a rotational speed of the three-phase motor and a value of a torque current component of the three-phase motor; and a PWM signal output unit that generates a PWM signal for performing pulse width modulation control of the three-phase inverter circuit based on the voltage command value generated as the three-phase modulation voltage command value or the two-phase modulation voltage command value, and outputs the PWM signal to the three-phase inverter circuit, wherein the voltage command switching unit sets the voltage command value to the three-phase modulation voltage command value until the determination value first reaches a predetermined first threshold value after the three-phase motor starts to rotate, switches the voltage command value to the two-phase modulation voltage command value when the determination value becomes larger than or equal to the first threshold value, and switches the voltage command value to the three-phase modulation voltage command value when the determination value becomes smaller than a predetermined second threshold value, which is smaller than the first threshold value.

With this configuration, a hydraulic system is established in which even at the time of a loss or degradation of the function of the aircraft central hydraulic power source, pressure oil is supplied from the backup hydraulic pump, and the actuator can be driven. In this hydraulic system, the motor drive control apparatus (aircraft motor drive control apparatus) that drives the three-phase motor for driving the backup hydraulic pump serving as a device installed in the aircraft and controls the operational status of the three-phase motor is configured similarly to the above-described aircraft motor drive control apparatus according to an aspect of the present invention. Accordingly, with the above configuration, in the aircraft actuator hydraulic system including the aircraft motor drive control apparatus, it is possible to suppress heat generation of the motor drive control apparatus itself, and to both ensure control performance and suppress heat generation at a high level in a well-balanced manner with a simple configuration that does not need a complicated control algorithm and control parameter for appropriately switching the fixed switching phase.

Also, with the above configuration, since it is possible in the motor drive control apparatus to both ensure control performance and suppress heat generation at a high level in a well-balanced manner, in the specifications of the three-phase motor, the rotational speed can be set high and the torque can be set high, thereby enabling a reduction in the size and weight of the three-phase motor. As a result, it is also possible to reduce the size and weight of the backup hydraulic pump.

Also, in the above aircraft actuator hydraulic system, it is desirable that the three-phase motor is provided as a synchronous motor using a permanent magnet, and at the time of an operation to stop the three-phase motor, the aircraft motor drive control apparatus stops an operation to output the PWM signal from the PWM signal output unit to the three-phase inverter circuit, interrupts supply of electric energy from the three-phase inverter circuit to the three-phase motor, and causes the three-phase motor to coast to stop.

With this configuration, since the three-phase motor is caused to coast to stop at the time of an operation to stop the three-phase motor, deceleration control at the time of the operation to stop the three-phase motor is not necessary in the motor drive control apparatus. Accordingly, even in the case where the operation to stop the three-phase motor is performed while drive control of the three-phase motor using the two-arm control method is being performed, a situation will not occur in which the fixed switching phase cannot be switched in appropriate order, and stable deceleration control is impossible. Also, since the three-phase motor is configured as a synchronous motor using a permanent magnet, when the three-phase motor coasts to stop, the rotation thereof stops in a short period of time due to electrical loss caused by an attracting force of the permanent magnet, in addition to mechanical friction. In other words, in the case of the aforementioned synchronous motor, an attracting force of the permanent magnet works as reluctance torque, and is consumed as a loss within the synchronous motor even if the synchronous motor is not energized. For this reason, the aforementioned synchronous motor will promptly stop even when coasting to stop, unlike an induction motor in which only a braking force caused by mechanical friction works. It is thereby possible to prevent a situation in which the three-phase motor does not stop for a long time when coasting to stop.

Also, in the above aircraft actuator hydraulic system, it is desirable that the backup hydraulic pump is provided as a variable displacement hydraulic pump, the determination value is a value of a rotational speed of the three-phase motor, and the aircraft motor drive control apparatus performs control so as to rotate the three-phase motor at a fixed rotational speed after starting rotation of the three-phase motor.

With this configuration, the three-phase motor is controlled so as to rotate at a fixed rotational speed. Even if the torque that is output from the three-phase motor to the backup hydraulic pump varies, the pump discharge flow rate is adjusted in the variable displacement backup hydraulic pump. For this reason, after the operation of the three-phase motor is started and the determination value, which is a rotational speed value, reaches the first threshold value, a state in which drive control of the three-phase motor using the two-arm control method is performed can be continued, unless any special change in situation occurs.

It should be appreciated that the above and other objects, features and advantages of the present invention will become apparent from the following description taken in conjunction with the accompanying drawings.

DETAILED DESCRIPTION OF THE INVENTION

Hereinafter, an embodiment for implementing the present invention will be described with reference to the drawings.

Note that the embodiment of the present invention is applicable widely to an aircraft motor drive control apparatus that drives a three-phase motor mounted in an aircraft to drive a device installed in the aircraft and controls an operational status of the three-phase motor, and to an aircraft actuator hydraulic system including this aircraft motor drive control apparatus.

Figure 1:
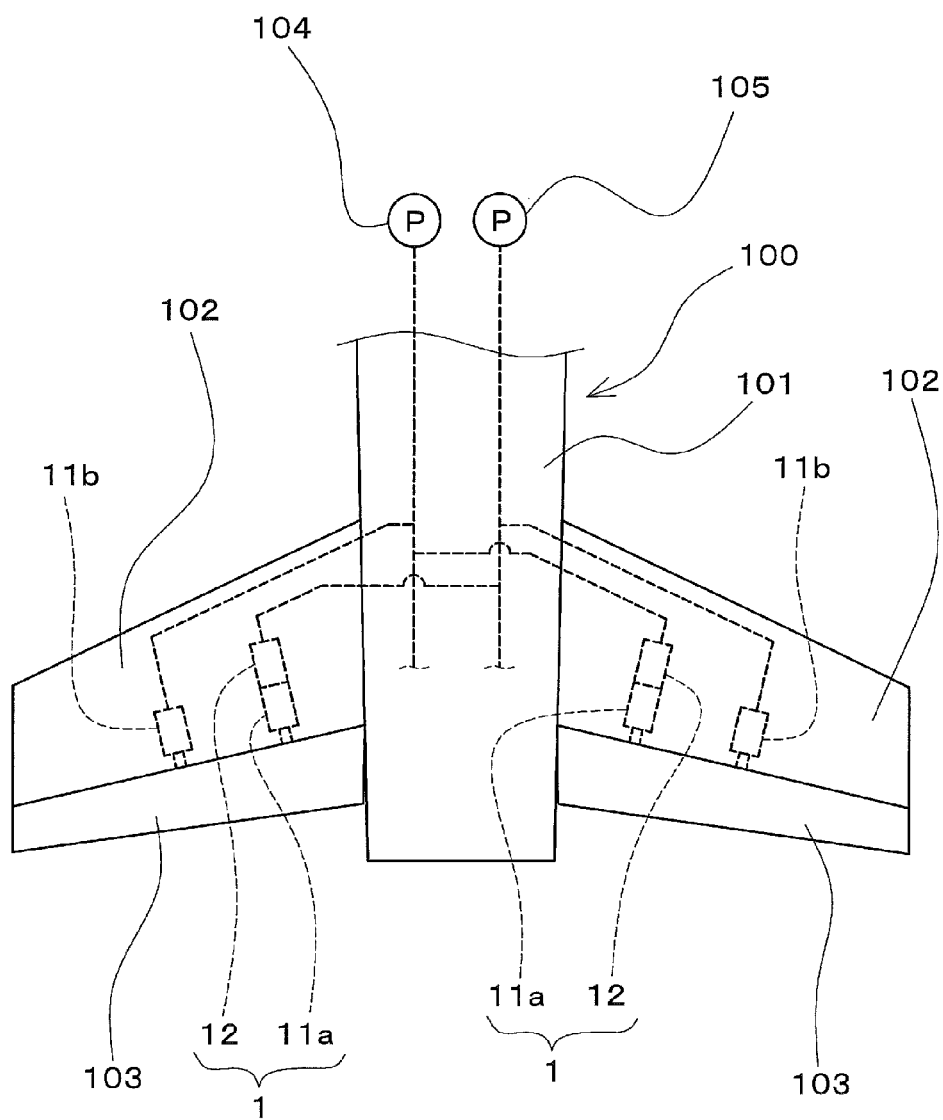
FIG. 1 is a schematic view of a part of an aircraft in which an aircraft actuator hydraulic system according to an embodiment of the present invention is installed.
Figure 2:
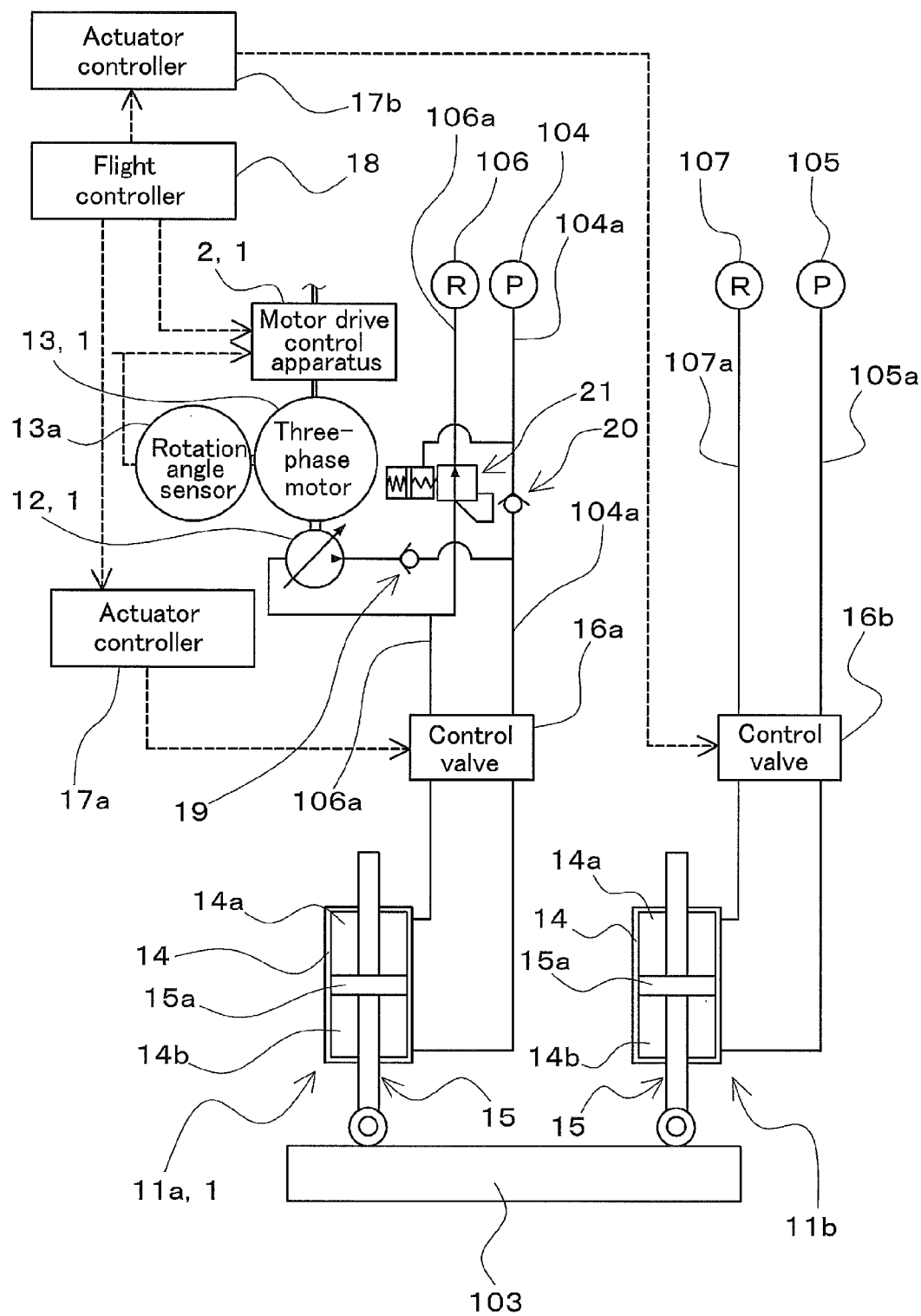
FIG. 2 is a schematic diagram schematically showing a hydraulic circuit including the aircraft actuator hydraulic system shown in FIG. 1.

FIG. 1 is a schematic diagram showing a part of an aircraft 100 in which an aircraft actuator hydraulic system 1 according to an embodiment of the present invention is installed. Note that FIG. 1 shows a rear part of an airframe 101 of the aircraft 100 and a pair of tailplanes (102, 102), and omits a vertical tail in the rear part of the airframe 101. FIG. 2 is a schematic diagram schematically showing a hydraulic circuit including the aircraft actuator hydraulic system 1.

The aircraft actuator hydraulic system 1 shown in FIGS. 1 and 2 is configured as a hydraulic system that has a hydraulically operated actuator 11a for driving moving surfaces 103, which serve as movable mechanisms installed in the aircraft 100, and that supplies pressure oil to this actuator 11a. Note that the moving surfaces 103 to which the aircraft actuator hydraulic system 1 is applied in the present embodiment are exemplary movable mechanisms to which the aircraft actuator hydraulic system 1 can be applied. The aircraft actuator hydraulic system 1 may be applied not only to the moving surfaces but also to movable mechanisms other than the moving surfaces. For example, the aircraft actuator hydraulic system 1 may be applied to movable mechanisms configured as struts (mechanisms supporting the airframe of the aircraft on the ground) of a landing gear (undercarriage) or the like.

Also, as shown in FIG. 2, the aircraft actuator hydraulic system 1 is provided with an aircraft motor drive control apparatus 2 according to an embodiment of the present invention. The aircraft motor drive control apparatus 2 is configured as a motor drive control apparatus that drives a three-phase motor 13 mounted in the aircraft 100 to drive a backup hydraulic pump 12, which serves as an exemplary device installed in the aircraft 100, and that controls the operational status of the three-phase motor 13. Note that the backup hydraulic pump 12, to which the aircraft motor drive control apparatus 2 is applied in the present embodiment, is an exemplary device to which the aircraft motor drive control apparatus 2 can be applied. The aircraft motor drive control apparatus 2 may be applied to not only the backup hydraulic pump but also devices other than the backup hydraulic pump. For example, the aircraft motor drive control apparatus 2 may be applied to electric actuators for driving moving surfaces, or devices such as struts of a landing gear or the like.

Hereinafter, a description will be given first of the aircraft actuator hydraulic system 1 (hereinafter also referred to simply as a "hydraulic system 1"), and then of the aircraft motor drive control apparatus 2 (hereinafter also referred to simply as a "motor drive control apparatus 2").

Also, the present embodiment will describe the moving surfaces 103 to which the hydraulic system 1 is applied, using an example of the moving surfaces 103 serving as elevators, which are control surfaces installed on the tailplanes 102 that are exemplary wings of the aircraft 100. Hereinafter, the moving surfaces 103 will be also referred to as the elevators 103. Note that the moving surfaces that are movable mechanisms to which the hydraulic system 1 is applied may by primary flight control surfaces configured as control surfaces such as ailerons or rudders, or secondary flight control surfaces configured as flaps or spoilers, in addition to the elevators.

The pair of tailplanes (102, 102) on the aircraft 100 is provided with the respective elevators 103, which are moving surfaces configured as control surfaces of the aircraft 100. The elevator 103 on each tailplane 102 is configured to be driven by a plurality of (e.g., two) actuators (11a, 11b), as shown as an example in FIG. 1. Inside each tailplane 102, the actuators (11a, 11b) for driving the elevator 103 and a backup hydraulic pump 12 configured to supply pressure oil to the actuator 11a, which is one of the actuators (11a, 11b), are installed.

The hydraulic system 1 of the present embodiment is configured to include the actuator 11a, the backup hydraulic pump 12, the three-phase motor 13, the motor drive control apparatus 2, and the like. Also, the hydraulic system 1 is provided for each of the tailplanes (102, 102) on the aircraft 100. In other words, one hydraulic system 1 is installed for each tailplane 102. The backup hydraulic pump 12, the three-phase motor 13, and the motor drive control apparatus 2 included in each hydraulic system 1 are installed within the corresponding tailplane 102.

Also, in the present embodiment, the actuators (11a, 11b) and the backup hydraulic pumps 12 that are installed in the respective tailplanes (102, 102) have the same configuration. The hydraulic systems 1 installed in the respective tailplanes 102 also have the same configuration. Therefore, a description will be given below of the actuators (11a, 11b) and the backup hydraulic pump 12 installed in a first tailplane 102, which is one of the tailplanes 102, and the hydraulic system 1 including the actuator 11a, which is one of these actuators (11a, 11b), and this backup hydraulic pump 12. The actuators (11a, 11b) and the backup hydraulic pump 12 installed in a second tailplane 102, which is the other tailplane 102, and the hydraulic system 1 including the actuator 11a, which is one of these actuators (11a, 11b), and this backup hydraulic pump 12 will not be described.

FIG. 2 is a hydraulic circuit diagram showing a hydraulic circuit including the actuators (11a, 11b) that drive the elevator 103 provided on the first tailplane 102, and the hydraulic system 1 that includes the actuator 11a, which is one of these actuators, and is configured to supply pressure oil to the actuator 11a. As shown in FIG. 2, each of the actuators (11a, 11b) includes a cylinder 14, a rod 15 provided with a piston 15a, and the like, and is configured such that the inside of the cylinder 14 is demarcated into two oil chambers (14a, 14b) by the piston 15a.

Each of the oil chambers (14a, 14b) in the cylinder 14 in the actuator 11a is able to be in communication, via a control valve 16a, with a first aircraft central hydraulic power source 104 and a reservoir circuit 106. Meanwhile, each of the oil chambers (14a, 14b) in the cylinder 14 in the actuator 11b is able to be in communication, via a control valve 16b, with a second aircraft central hydraulic power source 105 and a reservoir circuit 107. Note that the two oil chambers (14a, 14b) are not in communication with each other within the cylinders 14.

Each of the first aircraft central hydraulic power source 104 and the second aircraft central hydraulic power source 105 is provided as a hydraulic power source installed on the airframe 101 side (inside the airframe 101) as an independent system having a hydraulic pump for supplying the pressure oil. The actuators (11a, 11b) for driving the elevator 103 and actuators (not shown) for driving a control surface other than the elevator 103 are configured to operate as a result of pressure oil being supplied thereto from the first and second aircraft central hydraulic power sources (104, 105).

The first aircraft central hydraulic power source 104 is connected so as to be able to supply pressure oil to the actuator 11a installed in the first tailplane 102 and the actuator 11b installed in the second tailplane 102. Meanwhile, the second aircraft central hydraulic power source 105 is connected so as to be able to supply pressure oil to the actuator 11b installed in the first tailplane 102 and the actuator 11a installed in the second tailplane 102.

The reservoir circuit 106 includes a tank (not shown) into which oil (hydraulic fluid) that has been supplied as pressure oil and then discharged from the actuators 11a flows and returns. The reservoir circuit 106 is configured to be in communication with the first aircraft central hydraulic power source 104. The reservoir circuit 107, which is configured as a system independent from the reservoir circuit 106, includes a tank (not shown) into which oil (hydraulic fluid) that has been supplied as pressure oil and then discharged from the actuators 11b flows and returns. The reservoir circuit 107 is configured to be in communication with the second aircraft central hydraulic power source 105 configured as a system independent from the first aircraft central hydraulic power source 104.

Note that the reservoir circuit 106 is connected to the actuator 11a installed in the first tailplane 102 and the actuator 11b installed in the second tailplane 102. Furthermore, the reservoir circuit 106 is also connected to the first aircraft central hydraulic power source 104. Thus, the pressure of the oil returning to the reservoir circuit 106 is raised by the first aircraft central hydraulic power source 104, and the oil is then supplied to a predetermined actuator (11a, 11b). On the other hand, the reservoir circuit 107 is connected to the actuator 11b installed in the first tailplane 102 and the actuator 11a installed in the second tailplane 102. Furthermore, the reservoir circuit 107 is also connected to the second aircraft central hydraulic power source 105. Thus, the pressure of the oil returning to the reservoir circuit 107 is raised by the second aircraft central hydraulic power source 105, and the oil is then supplied to a predetermined actuator (11a, 11b).

The control valve 16a is provided as a valve mechanism for switching the state of connection of the oil chambers (14a, 14b) of the actuator 11a to a supply path 104a that is in communication with the first aircraft central hydraulic power source 104 and a discharge path 106a that is in communication with the reservoir circuit 106. Also, the control valve 16b is provided as a valve mechanism for switching the state of connection of the oil chambers (14a, 14b) of the actuator 11b to a supply path 105a that is in communication with the second aircraft central hydraulic power source 105 and a discharge path 107a that is in communication with the reservoir circuit 107. The control valve 16a is configured as, for example, a solenoid-operated control valve, and is driven based on a command signal from an actuator controller 17a for controlling the operation of the actuator 11a. Also, the control valve 16b is configured as, for example, a solenoid-operated control valve, and is driven based on a command signal from an actuator controller 17b for controlling the operation of the actuator 11b.

The aforementioned actuator controller 17a controls the actuator 11a based on a command signal from a flight controller 18, which is a superordinate computer that commands the elevator 103 to operate. Also, the actuator controller 17b controls the actuator 11b based on a command signal from the flight controller 18.

As a result of the aforementioned control valve 16a being switched based on the command from the actuator controller 17a, pressure oil is supplied from the supply path 104a to one of the oil chambers (14a, 14b) in the cylinder 14, and the oil is discharged from the other oil chamber (14a, 14b) to the discharge path 106a. The rod 15 is thereby displaced relative to the cylinder 14, and the elevator 103 is driven. Note that a description of the control valve 16b, which is configured similarly to the aforementioned control valve 16a, will be omitted.

The backup hydraulic pump 12 is configured as a variable displacement hydraulic pump having a swash plate. The backup hydraulic pump 12 is installed inside the tailplane 102, and is configured to supply pressure oil to the hydraulically operated actuator 11a that drives the elevator 103.

The backup hydraulic pump 12 is connected so as to be in communication on its suction side with the discharge path 106a, and is connected so as to be in communication on its discharge side with the supply path 104a via a check valve 19 such that pressure oil can be supplied to the supply path 104a. The backup hydraulic pump 12 is provided as a hydraulic pump that is capable of supplying pressure oil to the actuator 11a when a loss or degradation of the function (pressure oil supply function) of the first aircraft central hydraulic power source 104 has occurred due to a failure, oil leakage, or the like of the hydraulic pump of the first aircraft central hydraulic power source 104.

Also, a check valve 20 that allows flow of pressure oil toward the actuator 11a and prevents oil flow in a reverse direction is provided on an upstream side of a point on the supply path 104a to which the discharge side of the backup hydraulic pump 12 is connected (on the first aircraft central hydraulic power source 104 side). Also, a relief valve 21 that discharges pressure oil to the reservoir circuit 106 when the pressure of the oil discharged from the actuator 11a has increased is provided on a downstream side of a point on the discharge path 106a to which the discharge side of the backup hydraulic pump 12 is connected (on the reservoir circuit 106 side).

The relief valve 21 is provided with a pilot pressure chamber that is in communication with the supply path 104a and in which a spring is disposed. If the pressure of the pressure oil supplied from the supply path 104a falls below a predetermined pressure value, the pressure (pilot pressure) of the pressure oil supplied as pilot pressure oil from the supply path 104a to the aforementioned pilot pressure chamber also falls below a predetermined pressure value, and the discharge path 106a is blocked by the relief valve 21. At the time of a loss or degradation of the function of the first aircraft central hydraulic power source 104, the pressure of the oil discharged from the actuator 11a is raised by the backup hydraulic pump 12 without returning to the reservoir circuit 106, and the pressure oil whose pressure was raised is supplied to the actuator 11a, as a result of provision of the aforementioned check valves (19, 20) and the relief valve 21.

Note that the backup hydraulic pump 12 is configured as a variable displacement hydraulic pump, as mentioned above. Accordingly, as will be described later, even if the backup hydraulic pump 12 rotates at a predetermined fixed rotational speed, the flow rate of pressure oil supplied to the actuator 11a is configured to be controlled by changing the angle of the swash plate in the backup hydraulic pump 12 and thus changing the capacity thereof.

The three-phase motor 13 shown in FIG. 2 is configured as an electric motor that is linked to the backup hydraulic pump 12 via a coupling and drives the backup hydraulic pump 12. In other words, the three-phase motor 13 constitutes a three-phase motor of the present embodiment that is mounted in the aircraft 100 to drive the backup hydraulic pump 12, which is a device of the present embodiment that is installed in the aircraft 100.

Also, in the present embodiment, the three-phase motor 13 is provided as a synchronous motor using a permanent magnet as a rotor. Note that since the three-phase motor 13 is configured as a synchronous motor, efficiency can be improved, compared with the case where the three-phase motor 13 is configured as an induction motor in which slip may occur, which is a delay of the rotational speed of the rotor relative to the rotational magnetic field of the stator. Also, since the three-phase motor 13 is configured as a synchronous motor, when the three-phase motor 13 coasts to stop, rotation thereof can be stopped in a shorter time than in the case where it is configured as an induction motor, as will be described later.

Also, the three-phase motor 13 is provided with a rotation angle sensor 13a that detects a rotation angle that indicates the rotational speed (number of rotations) of the three-phase motor 13. The rotation angle sensor 13a is constituted by, for example, a rotary encoder, a resolver, a tacho generator, or the like.

Figure 3:
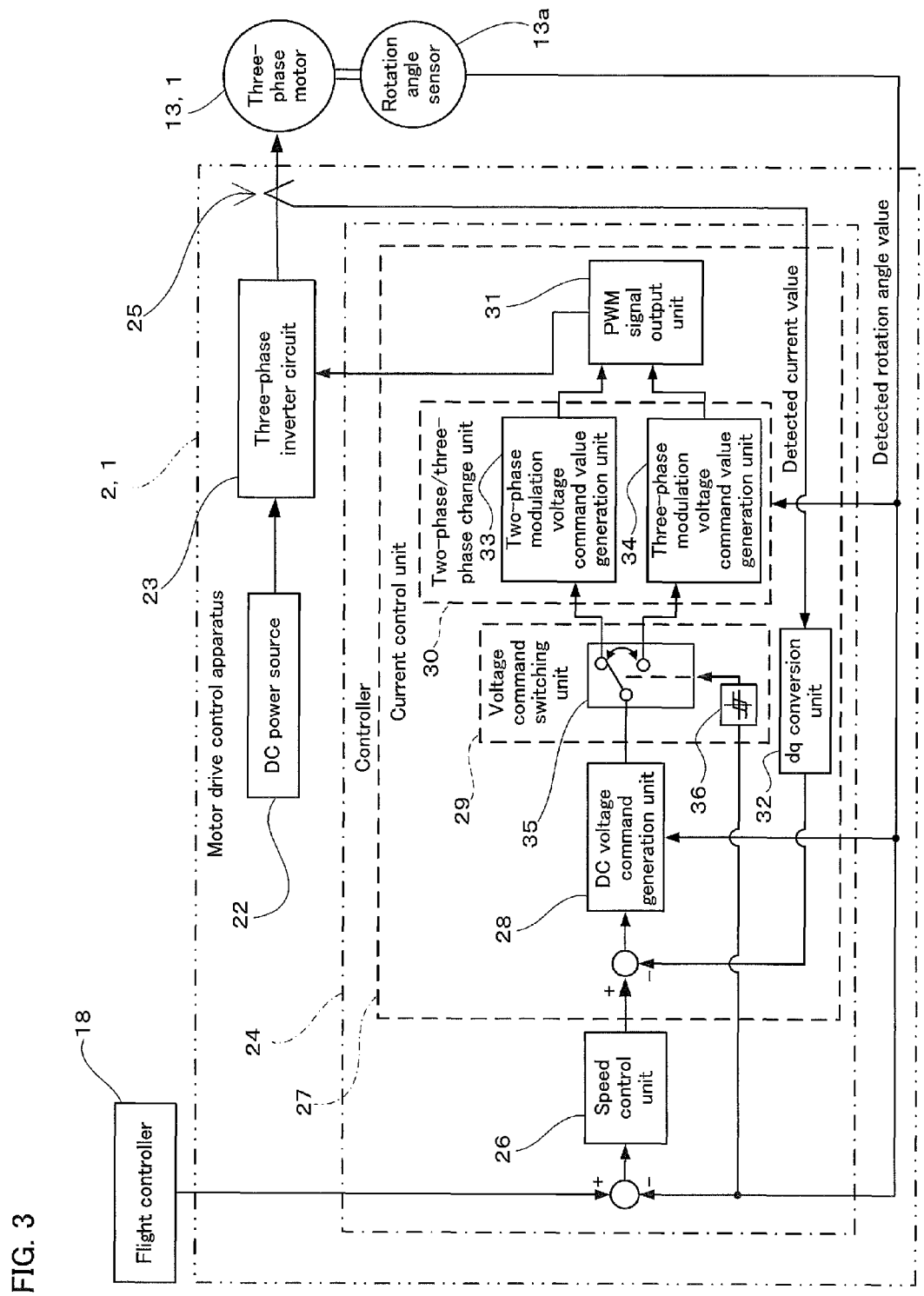
FIG. 3 is a block diagram showing a configuration of the aircraft motor drive control apparatus in the aircraft actuator hydraulic system shown in FIG. 2.

Next, a description will be given of the motor drive control apparatus 2 of the present embodiment that drives the three-phase motor 13 and controls the operational status of the three-phase motor 13. FIG. 3 is a block diagram showing the configuration of the motor drive control apparatus 2.

The motor drive control apparatus 2 shown in FIGS. 2 and 3 operates based on a command signal from the flight controller 18, which is a computer superordinate to the motor drive control apparatus 2. Note that the flight controller 18 is provided as a computer for controlling the operation of the moving surfaces such as the elevator 103, and transmits various command signals, which include a speed command signal for specifying the rotational speed of the three-phase motor 13, to the motor drive control apparatus 2. The operational status of the three-phase motor 13 is controlled by the motor drive control apparatus 2 based on the speed command signal from the flight controller 18. Note that the flight controller 18 includes, for example, a CPU (Central Processing Unit), a memory, an interface, and the like, which are not shown in the drawing.

Also, the flight controller 18 is connected to a pressure sensor (not shown) for detecting the discharge pressure of the first aircraft central hydraulic power source 104 or the pressure of pressure oil that passes through the supply path 104a such that a pressure detection signal detected by this pressure sensor is input to the flight controller 18. The flight controller 18 is configured to detect a loss or degradation of the function of the first aircraft central hydraulic power source 104 based on the above pressure detection signal.

If a loss or degradation of the function of the first aircraft central hydraulic power source 104 is detected by the flight controller 18, the operation of the three-phase motor 13 is started under the control of the motor drive control apparatus 2, based on a command signal from the flight controller 18. Thus, the backup hydraulic pump 12 operates, and pressure oil is supplied to the actuator 11a.

Also, a speed command signal for operating the three-phase motor 13 at a fixed rotational speed is transmitted from the flight controller 18. The speed command signal for specifying a fixed rotational speed is configured as, for example, a speed command signal for rotating the three-phase motor 13 at its rated rotational speed, and for rotating the backup hydraulic pump 12 at its rated rotational speed. Therefore, after causing the three-phase motor 13 to start to rotate, the motor drive control apparatus 2 performs control so as to rotate the three-phase motor 13 at a fixed rotational speed. The backup hydraulic pump 12, after being activated, continues to operate at the fixed rated rotational speed and a rotational speed that is near the fixed rotational speed.

Also, the backup hydraulic pump 12 is activated not only when a loss or degradation of the function of the first aircraft central hydraulic power source 104 is detected, but also when the aircraft 100 takes off and lands. In other words, when the aircraft 100 takes off and lands, the operation of the three-phase motor 13 is started and the backup hydraulic pump 12 is activated under the control of the motor drive control apparatus 2 based on a command signal from the flight controller 18. For example, the operation of the backup hydraulic pump 12 is performed after the time when the aircraft 100 starts an operation to take off until its speed reaches a cruising speed, and after the time when the aircraft 100 starts to prepare to land until it lands. In this case, even if a sudden loss or degradation of the function of the first aircraft central hydraulic power source 104 occurs at the stage of taking off or landing, safe flight can be ensured because the backup hydraulic pump 12 already operates at this time.

As shown in FIG. 3, the motor drive control apparatus 2 is configured to include a DC power source (direct-current power source) 22, an inverter 23, a controller 24, and the like. Note that a rectifier (converter) that rectifies and converts alternating current supplied from an AC power source installed on the airframe side of the aircraft 100 into direct current may be provided in place of the DC power source 22, for example.

Figure 4:
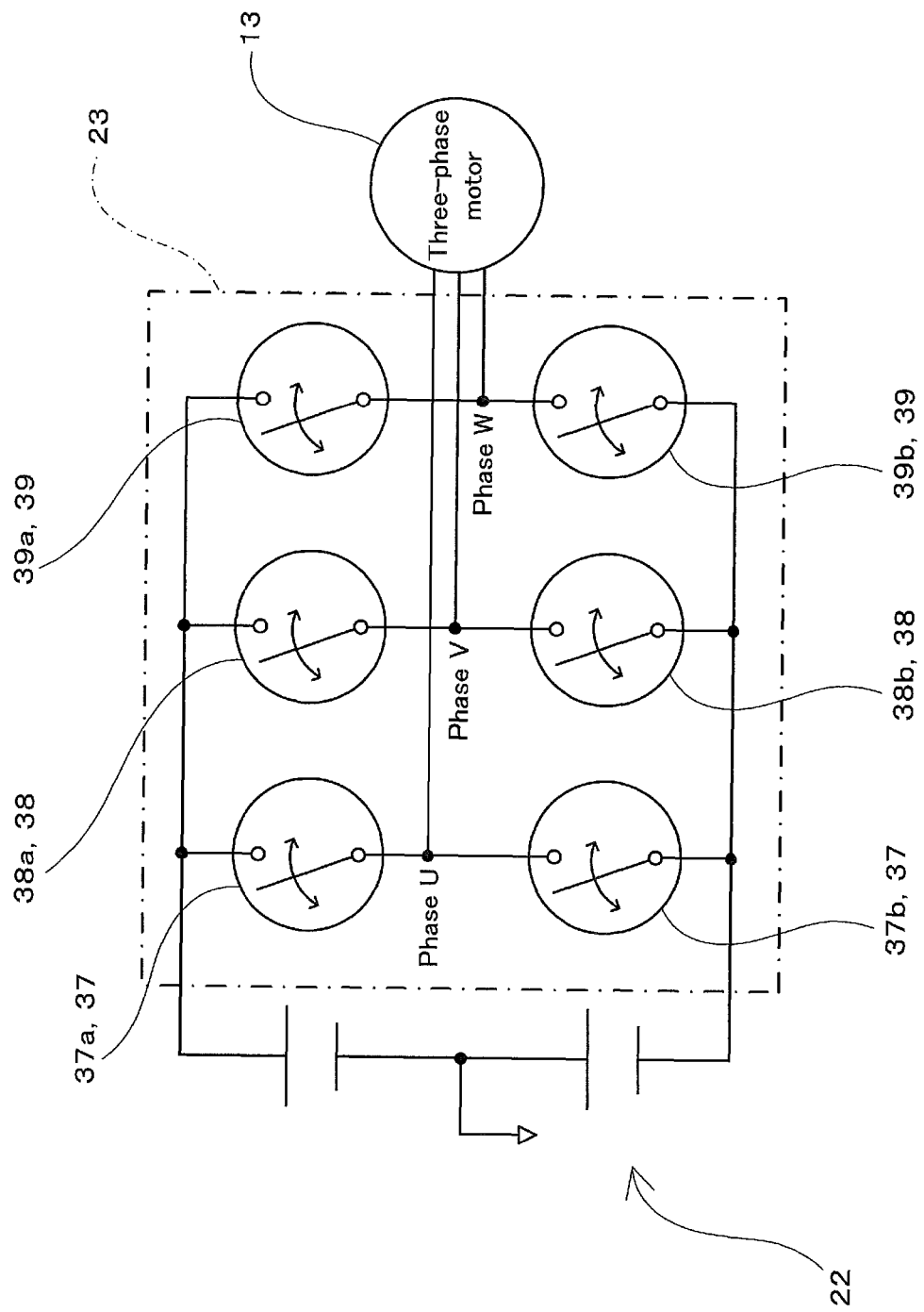
FIG. 4 is a schematic diagram illustrating a process of switching elements in a three-phase inverter circuit when drive control of the three-phase motor using a three-arm control method is performed.

The three-phase inverter circuit 23 has switching elements such as IGBTs (insulated gate bipolar transistors) or the like, and is configured to drive the three-phase motor 13 with electricity from the DC power source 22, based on a command from the controller 24. FIG. 4 is a schematic diagram showing a general configuration of the switching elements in the three-phase inverter circuit 23, together with the three-phase motor 13 and the DC power source 22.

As shown in FIG. 4, the three-phase inverter circuit 23 is provided with a phase-U inverter 37, a phase-V inverter 38, and a phase-W inverter 39. The phase-U inverter 37 is provided with an upper-arm switching element 37a and a lower-arm switching element 37b. The phase-V inverter 38 is provided with an upper-arm switching element 38a and a lower-arm switching element 38b. The phase-W inverter 39 is provided with an upper-arm switching element 39a and a lower-arm switching element 39b.

Also, as shown in FIG. 3, the current value of the current that runs through a drive line connecting the three-phase inverter circuit 23 to the three-phase motor 13 is configured to be detected by a current sensor 25 and input to the controller 24.

The controller 24 shown in FIG. 3 is provided as a control circuit for performing pulse width modulation control (PWM control) of the three-phase inverter circuit 23. This controller 24 controls the rotational speed of the three-phase motor 13, based on the speed command signal transmitted from the flight controller 18 for specifying the rotational speed of the three-phase motor 13, as well as a detected rotation angle value detected by the rotation angle sensor 13a. The controller 24 includes a speed control unit 26, a current control unit 27, and the like.

The speed control unit 26 is configured to perform feedback control of the rotational speed of the three-phase motor 13, based on the speed command signal for the three-phase motor 13 that is transmitted from the flight controller 18 and input to the motor drive control apparatus 2, as well as the detected rotation angle value detected by the rotation angle sensor 13a.

The current control unit 27 controls current of the three-phase motor 13 in accordance with a load applied to the three-phase motor 13, based on the feedback control of the rotational speed of the three-phase motor 13 by the speed control unit 26. The current control unit 27 includes a DC voltage command generation unit 28, a voltage command switching unit 29, a two-phase/three-phase change unit 30, a PWM signal output unit 31, and a dq conversion unit 32.

The dq conversion unit 32 converts the detected current value detected by the current sensor 25 into an exciting current component and a torque current component, and outputs these components. In other words, the dq conversion unit 32 calculates the exciting current component and the torque current component from a phase U current value, a phase V current value, and a phase W current value that were detected by the current sensor 25, and outputs the exciting current component and the torque current component, which are the calculation result.

The DC voltage command generation unit 28 generates a DC voltage command, based on the command signal from the speed control unit 26, the exciting current component and the torque current component of the three-phase motor 13 that are input from the dq conversion unit 32, and the detected rotation angle value detected by the rotation angle sensor 13a. In other words, the DC voltage command generation unit 28 generates a d-axis voltage command (a command for a d-axis component of armature voltage) and a q-axis voltage command (a command for a q-axis component of armature voltage).

The two-phase/three-phase change unit 30 includes a two-phase modulation voltage command value generation unit 33 and a three-phase modulation voltage command value generation unit 34. The two-phase/three-phase change unit 30 generates a voltage command value for specifying a voltage to be applied to the three-phase motor 13, based on the d-axis voltage command and a q-axis voltage command that were generated by the DC voltage command generation unit 28, as well as the detected rotation angle value that was detected by the rotation angle sensor 13a. Also, the two-phase/three-phase change unit 30 generates a voltage command value for specifying a voltage to be applied to the three-phase motor 13, based on later-described settings by the voltage command switching unit 29.

The three-phase modulation voltage command value generation unit 34 generates a three-phase modulation voltage command value as a voltage command value for specifying a voltage to be applied to the three-phase motor 13. On the other hand, the two-phase modulation voltage command value generation unit 33 generates, as the voltage command value for specifying a voltage to be applied to the three-phase motor 13, a two-phase modulation voltage command value for alternately fixing on/off states of switching elements of one phase in the three-phase inverter circuit 23, and modulating on/off states of switching elements of the other two phases. Also, the three-phase modulation voltage command value generation unit 34 generates a three-phase modulation voltage command value only when a setting is configured by the voltage command switching unit 29 so as to generate a three-phase modulation voltage command value as a voltage command value. Also, the two-phase modulation voltage command value generation unit 33 generates a two-phase modulation voltage command value only when a setting is configured by the voltage command switching unit 29 so as to generate a two-phase modulation voltage command value as a voltage command value.

The voltage command switching unit 29 is provided to configure a setting to switch the voltage command value from one of the three-phase modulation voltage command value and the two-phase modulation voltage command value to the other, based on a determination value, which is a value of the rotational speed of the three-phase motor 13 that is used in determination. The voltage command switching unit 29 includes a switching setting unit 35 and a switching determination unit 36.

The switching determination unit 36 compares the aforementioned determination value with a predetermined first threshold value and second threshold value, and determines whether the determination value is larger than or equal to the predetermined first threshold value or smaller than the predetermined second threshold value. Also, the switching setting unit 35 configures a setting to switch the voltage command value from one of the three-phase modulation voltage command value and the two-phase modulation voltage command value to the other, based on the result of the determination by the switching determination unit 36.

More specifically, the voltage command switching unit 29 sets the voltage command value to the three-phase modulation voltage command value after the three-phase motor 13 is activated and starts to rotate until the determination value first reaches the predetermined first threshold value. In other words, the voltage command value is set to the three-phase modulation voltage command value by the switching setting unit 35 until it is determined by the switching determination unit 36 that the determination value (hereinafter also referred to as a "number of motor rotations"), which is a value of the rotational speed of the three-phase motor 13 that is detected by the rotation angle sensor 13a, first reached the first threshold value (hereinafter also referred to as a "two-arm select speed") after the three-phase motor 13 was activated. Note that the two-arm select speed is set to be the same speed as the rated rotational speed of the three-phase motor 13 and the backup hydraulic pump 12, or a speed that is slightly lower than the rated rotational speed of the three-phase motor 13 and the backup hydraulic pump 12, for example.

If it is determined by the switching determination unit 36 that the motor rotation number, which is the determination value, became larger than or equal to the first threshold value (larger than or equal to the two-arm select speed), a setting is configured by the switching setting unit 35 such that the voltage command value is switched from the three-phase modulation voltage command value to the two-phase modulation voltage command value. Furthermore, if it is determined by the switching determination unit 36 that the number of motor rotations, which is the determination value, became smaller than the predetermined second threshold value (hereinafter also referred to as a "three-arm select speed") that is smaller than the two-arm select speed, a setting is configured by the switching setting unit 35 such that the voltage command value is switched from the two-phase modulation voltage command value to the three-phase modulation voltage command value. Note that the three-arm select speed is set to a lowest speed at which a voltage command value can be obtained that allows drive control of the three-phase motor 13 using the two-arm control method to be executed without error, or a speed that is slightly higher than this lowest speed, for example.

FIG. 4 is a schematic diagram illustrating a process of switching the switching elements in the three-phase inverter circuit 23 when a setting is configured by the voltage command switching unit 29 such that the voltage command value is switched to the three-phase modulation voltage command value, that is, when drive control of the three-phase motor 13 using the three-arm control method is performed. In a state where the voltage command value is set to the three-phase modulation voltage command value, as shown in FIG. 4, the on/off states of the switching elements (37a, 37b, 38a, 38b, 39a, 39b) of all three phases, namely the phase-U inverter 37, the phase-V inverter 38, and the phase-W inverter 39, are constantly switched.

Figure 5:
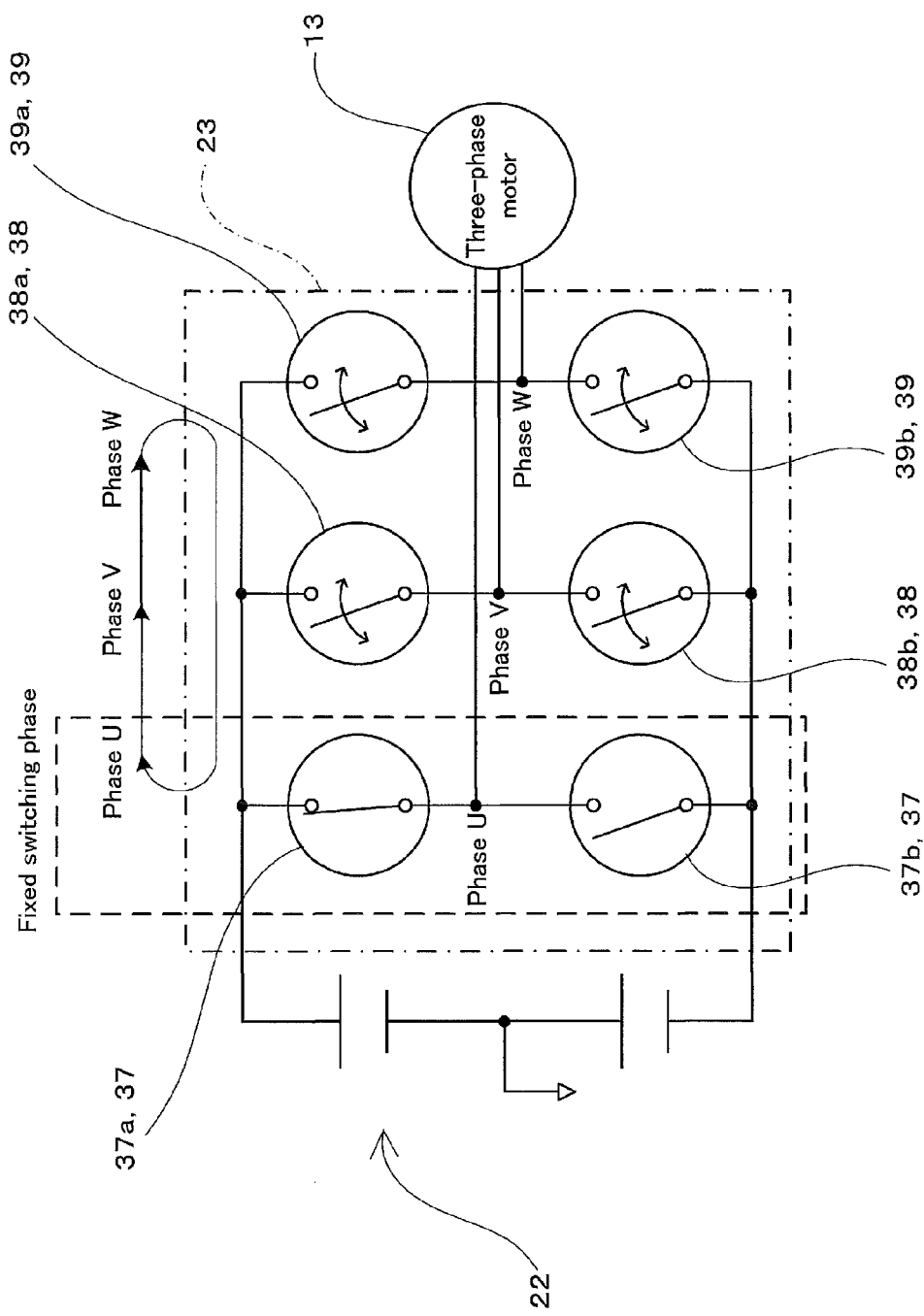
FIG. 5 is a schematic diagram illustrating a process of switching elements in a three-phase inverter circuit when drive control of the three-phase motor using a two-arm control method is performed.

FIG. 5 is a schematic diagram illustrating a process of switching the switching elements in the three-phase inverter circuit 23 when a setting is configured by the voltage command switching unit 29 such that the voltage command value is switched to the two-phase modulation voltage command value, that is, when drive control of the three-phase motor 13 using the two-arm control method is performed. In a state where the voltage command value is set to the two-phase modulation voltage command value, as shown in FIG. 4, the on/off states of the switching elements of one of three phases, namely the phase-U inverter 37, the phase-V inverter 38, and the phase-W inverter 39, are constantly fixed in an alternate manner, and the on/off states of the switching elements of the other two phases are constantly switched.

Note that FIG. 5 schematically shows a state in which the phase-U inverter 37 is set to a fixed switching phase in which the on/off states of the switching elements (37a, 37b) are fixed, and the on/off states of the switching elements (38a, 38b, 39a, 39b) of the phase-V inverter 38 and the phase-W inverter 39 are constantly switched. Also, FIG. 5 schematically shows a state in which the upper-arm switching element 37a in the phase-U inverter 37 is constantly fixed in an on state, and the lower-arm switching element 37b is constantly fixed in an off state.

Also, the voltage command switching unit 29 is configured to switch the voltage command value from the three-phase modulation voltage command value to the two-phase modulation voltage command value at the time when a voltage difference between voltage command values for two of the three phases in the three-phase modulation voltage command value becomes zero, that is, at the time when the phase voltages intersect. For example, the voltage command value is switched from the three-phase modulation voltage command value to the two-phase modulation voltage command value at the time when a voltage difference between the voltage command values for the phase-U inverter 37 and the phase-V inverter 38 becomes zero, at the time when a voltage difference between the voltage command values for the phase-V inverter 38 and the phase-W inverter 39 becomes zero, or at the time when a voltage difference between the voltage command values for the phase-W inverter 39 and the phase-U inverter 37 becomes zero.

The PWM signal output unit 31 generates a PWM signal for performing pulse width modulation control of the three-phase inverter circuit 23 based on the voltage command value generated by the two-phase/three-phase change unit 30, and outputs this PWM signal to the three-phase inverter circuit 23. In other words, the PWM signal output unit 31 generates and outputs the PWM signal for performing pulse width modulation control of the three-phase inverter circuit 23, based on the voltage command value generated as the three-phase modulation voltage command value or the two-phase modulation voltage command value.

Figure 6:
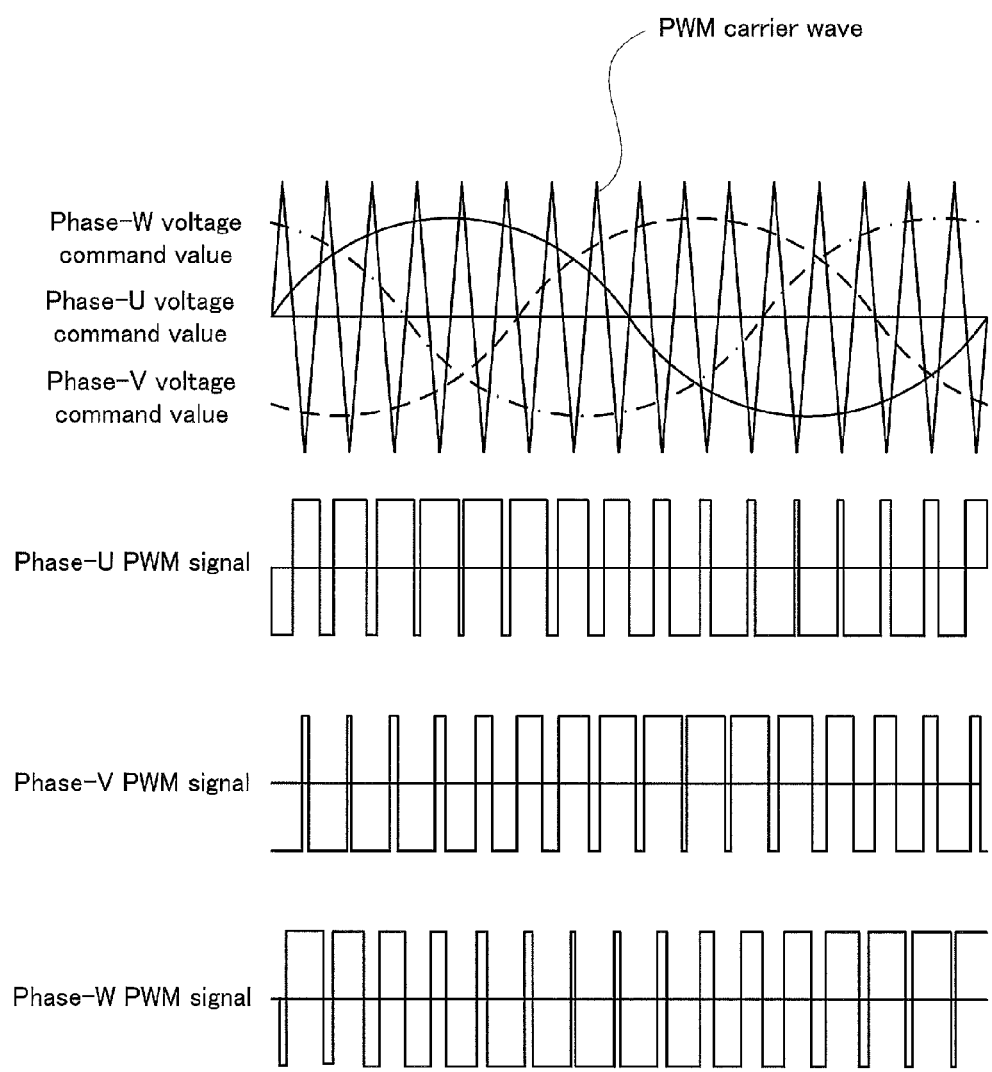
FIG. 6 is a schematic diagram illustrating a process of generating PWM signals when drive control of the three-phase motor using the three-arm control method is performed.

FIG. 6 is a schematic diagram illustrating a process of generating PWM signals when drive control of the three-phase motor 13 using the three-arm control method is performed. In a state where the voltage command value is set to the three-phase modulation voltage command value, as shown as an example in FIG. 6, a phase-U voltage command value, a phase-V voltage command value, and a phase-W voltage command value, which are sine waves with phases shifted from one another by 120°, are generated by the three-phase modulation voltage command unit 34. Note that in FIG. 6, the phase-U voltage command value is denoted by a solid line, the phase-V voltage command value is denoted by a broken line, and the phase-W voltage command value is denoted by a dashed line.

On the other hand, the PWM signal output unit 31 generates a PWM carrier wave, which is a triangular wave of a predetermined switching frequency (carrier frequency). As shown in FIG. 6, the PWM signal output unit 31 compares the phase-U voltage command value with the PWM carrier wave, and generates a phase-U PWM signal as a switching waveform signal for the phase-U inverter 37. Similarly, the PWM signal output unit 31 compares the phase-V voltage command value with the PWM carrier wave, and generates a phase-V PWM signal as a switching waveform signal for the phase-V inverter 38. Furthermore, the PWM signal output unit 31 compares the phase-W voltage command value with the PWM carrier wave, and generates a phase-W PWM signal as a switching waveform signal for the phase-W inverter 39. A process of switching the switching elements (37*a*, 37*b*, 38*a*, 38*b*, 39*a*, 39*b*) in the inverters (37, 38, 39) of the respective phases in the three-phase inverter circuit 23 is performed, based on these PWM signals.

Figure 7:
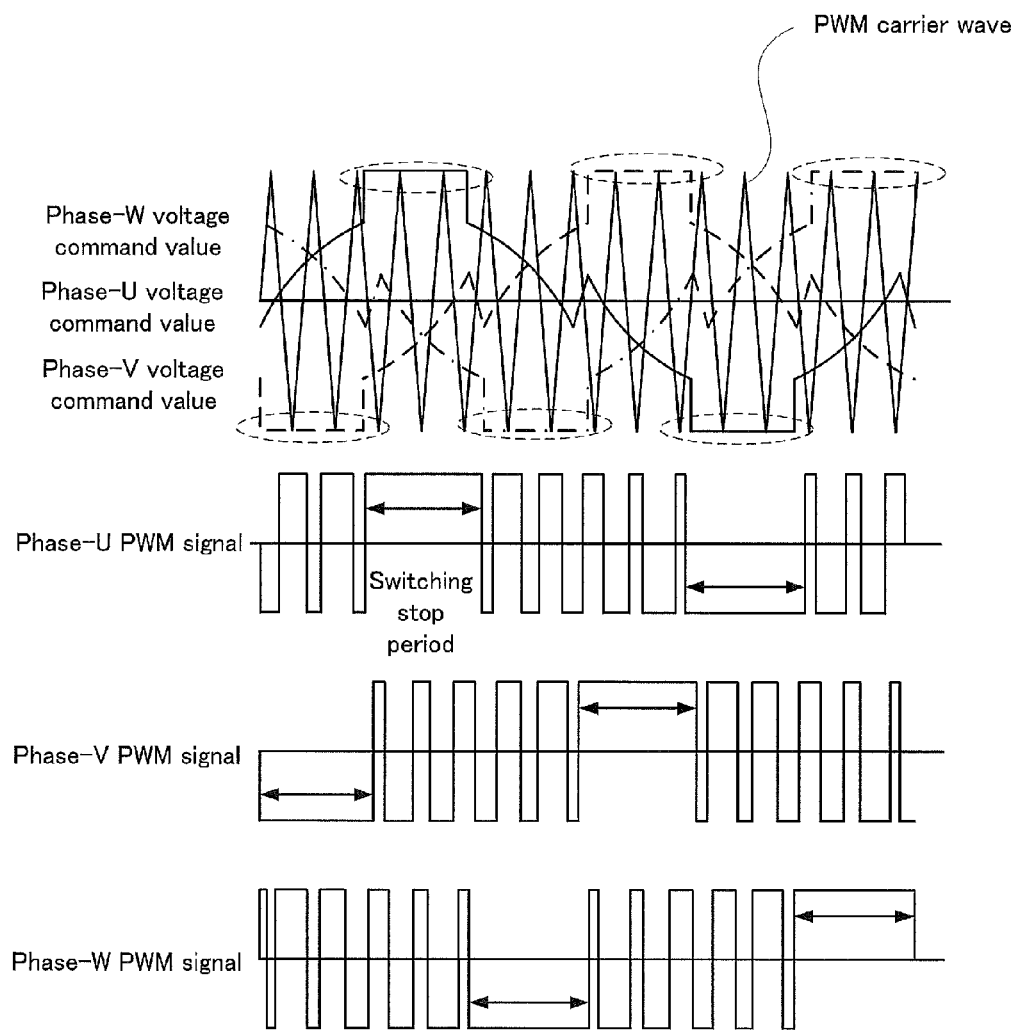
FIG. 7 is a schematic diagram illustrating a process of generating PWM signals when drive control of the three-phase motor using the two-arm control method is performed.

FIG. 7 is a schematic diagram illustrating a process of generating PWM signals when drive control of the three-phase motor 13 using the two-arm control method is performed. In a state where the voltage command value is set to the two-phase modulation voltage command value, as shown as an example in FIG. 7, a phase-U voltage command value, a phase-V voltage command value, and a phase-W voltage command value with phases shifted from one another by 120°, are generated by the two-phase modulation voltage command unit 33. Note that in FIG. 7, the phase-U voltage command value is denoted by a solid line, the phase-V voltage command value is denoted by a broken line, and the phase-W voltage command value is denoted by a dashed line.

In a state where the voltage command value is set to the two-phase modulation voltage command value, a voltage command value is generated for alternately fixing the on/off states of switching elements of one phase in the three-phase inverter circuit 23. In other words, as shown as an example in FIG. 7, the phase-U voltage command value, the phase-V voltage command value, and the phase-W voltage command value are generated for alternately fixing the on/off states of the switching elements (37*a*, 37*b*, 38*a*, 38*b*, 39*a*, 39*b*) in the phase U, phase V, and phase-W inverters (37, 38, 39). Note that in FIG. 7, sections of the phase-U voltage command value, the phase-V voltage command value, and the phase-W voltage command value for fixing the on/off states of the switching elements are enclosed by small broken lines.

On the other hand, the PWM signal output unit 31 generates a PWM carrier wave, which is a triangular wave of a predetermined switching frequency (carrier frequency). As shown in FIG. 7, the PWM signal output unit 31 compares the phase-U voltage command value with the PWM carrier wave, and generates a phase-U PWM signal as a switching waveform signal for the phase-U inverter 37. Similarly, the PWM signal output unit 31 compares the phase-V voltage command value with the PWM carrier wave, and generates a phase-V PWM signal as a switching waveform signal for the phase-V inverter 38. Furthermore, the PWM signal output unit 31 compares the phase-W voltage command value with the PWM carrier wave, and generates a phase-W PWM signal as a switching waveform signal for the phase-W inverter 39.

Also, the voltage command values for the phase U, phase V, and the phase W include the respective command values for specifying a period of time (switching stop period) during which the on/off states of switching elements are alternately fixed. Accordingly, the PWM signals for the phase U, the phase V, and the phase W that are generated by the PWM signal output unit 31 are configured as waveform signals for fixing the on/off states of switching elements during the switching stop period. Note that in FIG. 7, each switching stop period in a PWM signal is denoted by a double arrow.

In a state where the voltage command value is set to the two-phase modulation voltage command value, a process of switching the switching elements (37*a*, 37*b*, 38*a*, 38*b*, 39*a*, 39*b*) in the inverters (37, 38, 39) of the respective phases in the three-phase inverter circuit 23 is performed, based on these PWM signals including the switching stop periods.

Figure 8:
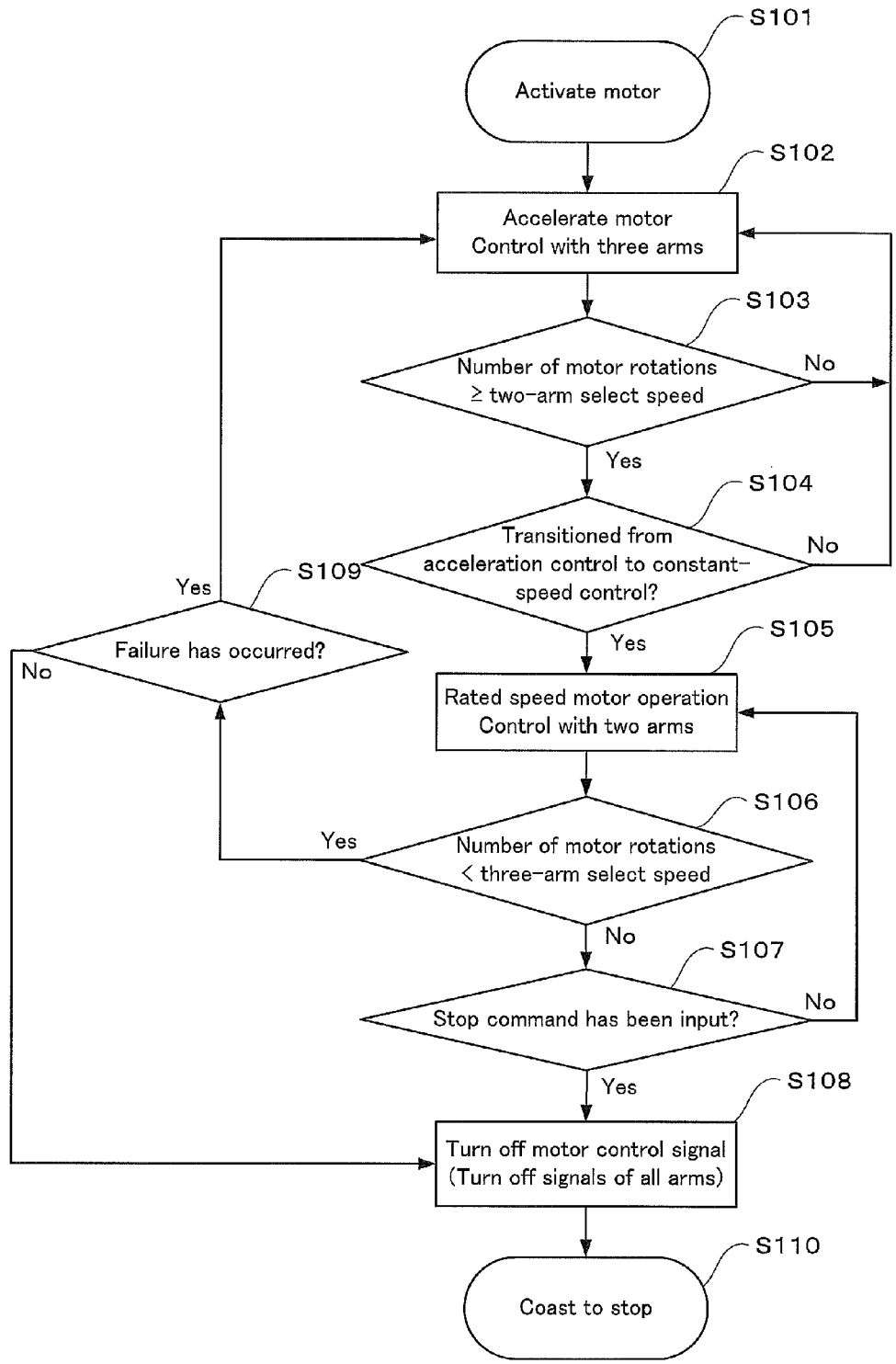
FIG. 8 is a flowchart illustrating processing in the aircraft motor drive control apparatus shown in FIG. 3.

Next, processing in the motor drive control apparatus 2 for performing drive control of the three-phase motor 13 by switching between the three-arm control method and the two-arm control method will be described according to the flowchart shown in FIG. 8.

When a motor activation command signal for activating the three-phase motor 13 is transmitted and input from the flight controller 18 to the motor drive control apparatus 2, the motor drive control apparatus 2 activates the three-phase motor 13 and starts the operation of the three-phase motor 13 (step S101). Then, acceleration control of the three-phase motor 13 is performed until the rotational speed of three-phase motor 13 reaches a fixed rotational speed (the rated rotational speed of the three-phase motor 13), for example for several seconds, based on a speed command signal of the fixed rotational speed transmitted from the flight controller 18 (step S102).

When acceleration control of the three-phase motor 13 is started, a PWM signal that is based on the voltage command value generated as the three-phase modulation voltage command value is output to the three-phase inverter circuit 23. Thus, drive control of the three-phase motor 13 using the three-arm control method is performed (step S102). Then, it is determined whether or not the number of motor rotations (the determination value that is a value of the rotational speed of the three-phase motor 13) is larger than or equal to the two-arm select speed (the first threshold value) (step S103). If the number of motor rotations is smaller than the two-arm select speed (step S103, No), that is, until the number of motor rotations reaches the two-arm select speed, drive control of the three-phase motor 13 using the three-arm control method is performed (step S102).

If the number of motor rotations is larger than or equal to the two-arm select speed (step S103, Yes), it is determined whether or not the control state of the three-phase motor 13 has transitioned from acceleration control to constant-speed control at the rated rotational speed of the three-phase motor 13 (step S104). If the control state of the three-phase motor 13 has not transitioned to constant-speed control (step S104, No), processes in steps S102 and S103 are repeated.

On the other hand, if the control state of the three-phase motor 13 has transitioned to constant-speed control (step S104, Yes), the voltage command value is switched from the three-phase modulation voltage command value to the two-phase modulation voltage command value. In other words, if the number of motor rotations is larger than or equal to the two-arm select speed (step S103, Yes) and the control state of the three-phase motor 13 has transitioned to constant-speed control (step S104, Yes), the PWM signal that is based on the voltage command value generated as the two-phase modulation voltage command value is output to the three-phase inverter circuit 23. Thus, drive control of the three-phase motor 13 using the two-arm control method is performed (step S105). Note that the process in step S104 does not necessarily have to be executed.

Upon drive control of the three-phase motor 13 using the two-arm control method being started, it is determined whether or not the number of motor rotations is smaller than the three-arm select speed (the second threshold value) (step S106). If the number of motor rotations is larger than or equal to the three-arm select speed (step S106, No), then it is determined whether or not a stop command signal for stopping the operation of the three-phase motor 13 that is a command signal transmitted from the flight controller 18 has been input to the motor drive control apparatus 2 (step S107). If the stop command signal has not been input (step S107, No), drive control of the three-phase motor 13 using the two-arm control method is performed (step S105) while the number of motor rotations is larger than or equal to the three-arm select speed (step S106, No).

If the stop command signal has been input to the motor drive control apparatus 2 (step S107, Yes), an operation to stop the three-phase motor 13 is performed. In this case, the motor drive control apparatus 2 turns off the control signal for the three-phase motor 13, and turns off signals for the switching elements (37*a*, 37*b*, 38*a*, 38*b*, 39*a*, 39*b*) of all arms (step S108). In other words, at the time of the operation to stop the three-phase motor 13, the motor drive control apparatus 2 stops the operation to output the PWM signal from the PWM signal output unit 31 to the three-phase inverter circuit 23 and interrupts supply of electric energy from the three-phase inverter circuit 23 to the three-phase motor 13. Thus, at the time of the operation to stop the three-phase motor 13, the motor drive control apparatus 2 causes the three-phase motor 13 to coast to stop (step S110).

On the other hand, if it is determined in step S106 that the number of motor rotations is smaller than the three-arm select speed (step S106, Yes), it is determined whether or not a failure has occurred in the motor drive control apparatus 2 and the three-phase motor 13 (step S109). As the determination about whether a failure has occurred, for example, determination about whether overcurrent has occurred or determination about whether an abnormal temperature increase has occurred is performed. The determination about whether overcurrent has occurred is performed in the motor drive control apparatus 2, based on the detected current value that is detected by the current sensor 25, for example. Also, the determination about whether an abnormal temperature increase has occurred is performed in the motor drive control apparatus 2, based on the result of detection by a temperature sensor (not shown) that is attached to the motor drive control apparatus 2 or to the three-phase motor 13, for example.

If it is determined that a failure has not occurred in the motor drive control apparatus 2 and the three-phase motor 13 (step S109, Yes), the voltage command value is switched from the three-phase modulation voltage command value to the two-phase modulation voltage command value. Then, a PWM signal that is based on the voltage command value generated as the two-phase modulation voltage command value is output to the three-phase inverter circuit 23. Thus, drive control of the three-phase motor 13 using the three-arm control method is performed (step S102). After the voltage command value is switched to the two-phase modulation voltage command value and drive control of the three-phase motor 13 using the two-arm control method is started (step S102), the processes in step S103 and subsequent steps are repeated.

On the other hand, if it is determined that a failure has occurred in the motor drive control apparatus 2 and the three-phase motor 13 (step S109, No), the motor drive control apparatus 2 turns off the control signal for the three-phase motor 13 (step S108). In other words, the motor drive control apparatus 2 stops the operation to output the PWM signal, and interrupts supply of electric energy from the three-phase inverter circuit 23 to the three-phase motor 13. Thus, the motor drive control apparatus 2 causes the three-phase motor 13 to coast to stop (step S110).

As described above, with the motor drive control apparatus 2, a setting is configured such that the voltage command value is switched from one of the three-phase modulation voltage command value and the two-phase modulation voltage command value to the other by the operation of the voltage command switching unit 29, based on the determination value (number of motor rotations) related to the rotational speed of the three-phase motor 13. The voltage command switching unit 29 sets the voltage command value to the three-phase modulation voltage command value until the determination value first reaches the first threshold value (the two-arm select speed) after the start of operation, switches the voltage command value to the two-phase modulation voltage command value if the determination value becomes larger than or equal to the first threshold value, and switches the voltage command value to the three-phase modulation voltage command value if the determination value becomes smaller than the second threshold value (the three-arm select speed), which is smaller than the first threshold value. Accordingly, in an operating region of a low rotational speed, which is a short temporal area after the start of operation, drive control of the three-phase motor 13 using the three-arm control method is performed by the motor drive control apparatus 2. However, upon the determination value reaching the first threshold value, a setting is configured such that the voltage command value is switched to the two-phase modulation voltage command value. Thereafter, unless the determination value becomes smaller than the second threshold value, drive control of the three-phase motor 13 using the two-arm control method is continued by the motor drive control apparatus 2.

Also, in the motor drive control apparatus 2 used in drive control of the three-phase motor 13 for driving the backup hydraulic pump 12 serving as a device installed in the aircraft 100, the operational status of the three-phase motor 13 is rarely controlled in the operating region of a low rotational speed. Therefore, in most operational states once the operation of the three-phase motor 13 has started, drive control of the three-phase motor 13 using the two-arm control method is performed. For this reason, in most operational states, the number of switching elements that perform a switching operation is reduced, and thus heat generation is suppressed by means of a reduction of switching element loss. It is thereby possible to suppress heat generation of the motor drive control apparatus 2 itself, and to both ensure control performance and suppress heat generation at a high level in a well-balanced manner. Also, both the ensuring of control performance and the suppressing of heat generation are achieved at a high level in a well-balanced manner with a simple configuration in which a setting is configured such that the voltage command value is switched from one of the three-phase modulation voltage command value and the two-phase modulation voltage command value to the other, based on the determination value related to the rotational speed of the three-phase motor 13. In other words, such a complicated control algorithm and control parameter as those disclosed in JP2005-117869A are not necessary.

Accordingly, according to the present embodiment, it is possible to provide an aircraft motor drive control apparatus 2 that is capable of suppressing heat generation of the motor drive control apparatus 2 itself, and is capable of both ensuring control performance and suppressing heat generation at a high level in a well-balanced manner with a simple configuration that does not need a complicated control algorithm and control parameter for appropriately switching a fixed switching phase.

Also, with the motor drive control apparatus 2, the voltage command value is switched from the three-phase modulation voltage command value to the two-phase modulation voltage command value at the time when the voltage difference between the voltage command values for two of the three phases in the three-phase modulation voltage command value becomes zero. For this reason, it is possible to make it less likely that waveform distortion occurs when the voltage command value is switched from the three-phase modulation voltage command value to the two-phase modulation voltage command value, and occurrence of instantaneous overcurrent and of electro-magnetic interference (EMI) can be suppressed.

Also, with the aircraft actuator hydraulic system 1, the hydraulic system 1 is established in which even at the time of a loss or degradation of the function of the aircraft central hydraulic power source (104, 105), pressure oil is supplied from the backup hydraulic pump 12, and thus the actuator 11a can be driven. Further, in this hydraulic system 1, the motor drive control apparatus 2, which drives the three-phase motor 13 for driving the backup hydraulic pump 12 serving as a device installed in the aircraft 100 and controls the operational status of the three-phase motor 13, achieves the above-described effect. Accordingly, according to the present embodiment, in the hydraulic system 1, it is possible to suppress heat generation of the motor drive control apparatus 2 itself, and to both ensure control performance and suppress heat generation at a high level in a well-balanced manner with a simple configuration that does not need a complicated control algorithm and control parameter for appropriately switching the fixed switching phase.

Also, with the hydraulic system 1, it is possible in the motor drive control apparatus 2 to both ensure control performance and suppress heat generation at a high level in a well-balanced manner, and therefore, the specifications of the three-phase motor 13 can be set to specifications with a high rotational speed, thereby enabling a reduction in the size and weight of the three-phase motor 13. As a result, it is also possible to reduce the size and weight of the backup hydraulic pump 12.

Also, with the hydraulic system 1, since the three-phase motor 13 is caused to coast to stop at the time of the operation to stop the three-phase motor 13, deceleration control at the time of the operation to stop the three-phase motor 13 is not necessary in the motor drive control apparatus 2. Accordingly, even when the operation to stop the three-phase motor 13 is performed while drive control of the three-phase motor 13 using the two-arm control method is being performed, a situation will not occur in which the fixed switching phase cannot be switched in appropriate order, and stable deceleration control is impossible. Also, since the three-phase motor 13 is configured as a synchronous motor using a permanent magnet, when the three-phase motor 13 coasts to stop, the rotation thereof stops in a short period of time due to electrical loss caused by an attracting force of the permanent magnet, in addition to mechanical friction. In other words, in the case of the aforementioned synchronous motor, an attracting force of the permanent magnet works as reluctance torque, and is consumed as a loss within the synchronous motor even if the synchronous motor is not energized. For this reason, this synchronous motor will promptly stops even when coasting to stop, unlike an induction motor with which only a braking force caused by mechanical friction works. It is thereby possible to prevent a situation in which the three-phase motor 13 does not stop for a long time when coasting to stop.

Also, with the hydraulic system 1, the three-phase motor 13 is controlled so as to rotate at a fixed rotational speed. Even if torque that is output from the three-phase motor 13 to the backup hydraulic pump 12 varies, the pump discharge flow rate is adjusted in the variable displacement backup hydraulic pump 12. For this reason, after the operation of the three-phase motor 13 is started and the determination value, which is a rotational speed value, reaches the first threshold value, a state in which drive control of the three-phase motor 13 using the two-arm control method is performed can be continued, unless any special change in situation occurs.

Although the embodiment of the present invention has been described thus far, the present invention is not limited to the embodiment described above, and various modifications may be made within the scope recited in the claims. For example, the following modifications can be made for implementation.

(1) Although the above embodiment described the backup hydraulic pump as an example of a device driven by the three-phase motor for which drive control is performed by the motor drive control apparatus, this need not be the case. In other words, a motor drive control apparatus that performs drive control of a three-phase motor for driving a device other than a backup hydraulic pump may be implemented.

For example, if a hydraulic pump in an aircraft central hydraulic power source is configured as an electrically powered hydraulic pump driven by a motor, a motor drive control apparatus that performs drive control of a three-phase motor for driving this hydraulic pump, which serves as a device installed in an aircraft, may be implemented. Also, if an actuator for driving a moving surface is configured as an electric actuator, a motor drive control apparatus that performs drive control of a three-phase motor for driving the electric actuator, which serves as a device installed in an aircraft, may be implemented. Also, a motor drive control apparatus that performs drive control of a three-phase motor for driving struts of a landing gear or the like, which serves as a device installed in an aircraft, may be implemented.

(2) Although the above embodiment described a moving surface as an example of a movable mechanism driven by an actuator in a hydraulic system, this need not be the case. In other words, a mode may be implemented in which an actuator in a hydraulic system drives a movable mechanism other than a moving surface. For example, a mode may be implemented in which an actuator in a hydraulic system drives struts of a landing gear or the like, which serves as a movable mechanism installed in an aircraft.

(3) Although the above embodiment described an exemplary mode in which the voltage command switching unit configures a setting such that the voltage command value is switched from one of the three-phase modulation voltage command value and the two-phase modulation voltage command value to the other, based on the determination value that is used in determination, which is a value of the rotational speed of the three-phase motor, this need not be the case. A mode may be implemented in which a voltage command switching unit is provided for configuring a setting to switch the voltage command value from one of the three-phase modulation voltage command value and the two-phase modulation voltage command value to the other, based on the determination value that is used in determination, which is a value of the torque current component of the three-phase motor.

The present invention is widely applicable to an aircraft motor drive control apparatus that drives a three-phase motor mounted in an aircraft to drive a device installed in the aircraft and controls an operational status of this three-phase motor, and an aircraft actuator hydraulic system including the aircraft motor drive control apparatus. The present invention is not limited to the above-described embodiments, and all modifications, applications and equivalents thereof that fall within the claims, for which modifications and applications would become apparent by reading and understanding the present specification, are intended to be embraced therein.

What is claimed is:

1. An aircraft motor drive control apparatus for driving a three-phase motor mounted in an aircraft to drive a device installed in the aircraft, and controlling an operational status of the three-phase motor, comprising:
   a three-phase inverter circuit that has switching elements and drives the three-phase motor; and a controller that performs pulse width modulation control of the three-phase inverter circuit, the controller comprising: a three-phase modulation voltage command value generation unit that generates a three-phase modulation voltage command value as a voltage command value for specifying a voltage to be applied to the three-phase motor;
   a two-phase modulation voltage command value generation unit that generates, as the voltage command value, a two-phase modulation voltage command value for alternately fixing an on/off state of a switching element of one phase in the three-phase inverter circuit, and modulating on/off states of switching elements of the other two phases;
   a voltage command switching unit for configuring a setting so as to switch the voltage command value from one of the three-phase modulation voltage command value and the two-phase modulation voltage command value to the other, based on a determination value that is used in determination, which is one of a value of a rotational speed of the three-phase motor and a value of a torque current component of the three-phase motor; and
   a PWM signal output unit that generates a PWM signal for performing pulse width modulation control of the three-phase inverter circuit based on the voltage command value generated as the three-phase modulation voltage command value or the two-phase modulation voltage command value, and outputs the PWM signal to the three-phase inverter circuit,
   wherein the voltage command switching unit sets the voltage command value to the three-phase modulation voltage command value until the determination value first reaches a predetermined first threshold value after the three-phase motor starts to rotate, switches the voltage command value to the two-phase modulation voltage command value when the determination value becomes larger than or equal to the first threshold value, and switches the voltage command value to the three-phase modulation voltage command value when the determination value becomes smaller than a predetermined second threshold value, which is smaller than the first threshold value, and
   the voltage command switching unit switches the voltage command value from the three-phase modulation voltage command value to the two-phase modulation voltage command value at the time when a voltage difference between voltage command values for two of three phases in the three-phase modulation voltage command value becomes zero and when it is determined that a failure does not occur in the aircraft motor drive control apparatus and the three-phase motor, the failure being at least one of occurrence of overcurrent and an abnormal temperature increase.

2. An aircraft actuator hydraulic system that has a hydraulically operated actuator for driving a movable mechanism installed in an aircraft and supplies pressure oil to the actuator, comprising:
   the actuator operating as a result of pressure oil being supplied from an aircraft central hydraulic power source, which is a hydraulic power source installed on an airframe side of the aircraft, and driving the movable mechanism;
   a backup hydraulic pump capable of supplying pressure oil to the actuator when a loss or degradation of a function of the aircraft central hydraulic power source occurs;
   a three-phase motor that drives the backup hydraulic pump; and
   an aircraft motor drive control apparatus that drives the three-phase motor mounted in the aircraft to drive the backup hydraulic pump and controls an operational status of the three-phase motor,
   wherein the aircraft motor drive control apparatus includes a three-phase inverter circuit that has switching elements and drives the three-phase motor, and a controller that performs pulse width modulation control of the three-phase inverter circuit,
   the controller comprising:
   a three-phase modulation voltage command value generation unit that generates a three-phase modulation voltage command value as a voltage command value for specifying a voltage to be applied to the three-phase motor;
   a two-phase modulation voltage command value generation unit that generates, as the voltage command value, a two-phase modulation voltage command value for alternately fixing an on/off state of a switching element of one phase in the three-phase inverter circuit, and modulating on/off states of switching elements of the other two phases;
   a voltage command switching unit for configuring a setting so as to switch the voltage command value from one of the three-phase modulation voltage command value and the two-phase modulation voltage command value to the other, based on a determination value that is used in determination, which is one of a value of a rotational speed of the three-phase motor and a value of a torque current component of the three-phase motor; and
   a PWM signal output unit that generates a PWM signal for performing pulse width modulation control of the three-phase inverter circuit based on the voltage command value generated as the three-phase modulation voltage command value or the two-phase modulation voltage command value, and outputs the PWM signal to the three-phase inverter circuit, wherein the voltage command switching unit sets the voltage command value to the three-phase modulation voltage command value until the determination value first reaches a predetermined first threshold value after the three-phase motor starts to rotate, switches the voltage command value to the two-phase modulation voltage command value when the determination value becomes larger than or equal to the first threshold value, and switches the voltage command value to the three-phase modulation voltage command value when the determination value becomes smaller than a predetermined second threshold value, which is smaller than the first threshold value, and the voltage command switching unit switches the voltage command value from the three-phase modulation voltage command value to the two-phase modulation voltage command value at the time when a voltage difference between voltage command values for two of three phases in the three-phase modulation voltage command value becomes zero and when it is determined that a failure does not occur in the aircraft motor drive control apparatus and the three-phase motor, the failure being at least one of occurrence of overcurrent and an abnormal temperature increase.

3. The aircraft actuator hydraulic system according to claim 2, wherein the three-phase motor is provided as a synchronous motor using a permanent magnet, and at the time of an operation to stop the three-phase motor, the aircraft motor drive control apparatus stops an operation to output the PWM signal from the PWM signal output unit to the three-phase inverter circuit, interrupts supply of electric energy from the three-phase inverter circuit to the three-phase motor, and causes the three-phase motor to coast to stop.

4. The aircraft actuator hydraulic system according to claim 2, wherein the backup hydraulic pump is provided as a variable displacement hydraulic pump, the determination value is a value of a rotational speed of the three-phase motor, and the aircraft motor drive control apparatus performs control so as to rotate the three-phase motor at a fixed rotational speed after starting rotation of the three-phase motor.

5. The aircraft actuator hydraulic system according to claim 3, wherein the backup hydraulic pump is provided as a variable displacement hydraulic pump, the determination value is a value of a rotational speed of the three-phase motor, and the aircraft motor drive control apparatus performs control so as to rotate the three-phase motor at a fixed rotational speed after starting rotation of the three-phase motor.

* * * * *